United States Patent [19]

Muzzarelli

[11] Patent Number: 4,616,988

[45] Date of Patent: Oct. 14, 1986

[54] MOULDING MACHINE FOR THE PRODUCTION OF CACIOCAVALLO AND SIMILAR CHEESES

[76] Inventor: Gabriele Muzzarelli, Via Marzabotto, 116, 41100 Modena, Italy

[21] Appl. No.: 701,984

[22] Filed: Feb. 15, 1985

[30] Foreign Application Priority Data

Feb. 29, 1984 [IT] Italy ............................... 21050/84[U]

[51] Int. Cl.⁴ ...................... B29C 33/34; B29C 39/04; B29C 43/04
[52] U.S. Cl. .................................... 425/150; 425/166; 425/183; 425/190; 425/259; 425/261
[58] Field of Search .................. 425/259, 261, 348 R, 425/328, 183, 190, 150, 166, 542, 557, 562; 17/32

[56] References Cited

U.S. PATENT DOCUMENTS

| | | | |
|---|---|---|---|
| 3,063,098 | 11/1962 | Eyberger | 425/361 |
| 3,633,245 | 1/1972 | Parton | 425/261 |
| 4,065,241 | 12/1977 | Orlowski | 425/228 |
| 4,193,167 | 3/1980 | Orlowski et al. | 425/361 |
| 4,472,127 | 9/1984 | Cyriax et al. | 425/183 |

*Primary Examiner*—Willard E. Hoag
*Attorney, Agent, or Firm*—Steinberg & Raskin

[57] ABSTRACT

A moulding machine for the production of caciocavallo, provola, scamorza and similar plastic curd cheeses, comprising a thrust section for the plastic curd, and an actual moulding section fed by the thrust section and comprising: (a) a fixed plate provided with apertures for receiving the plastic curd supplied by the thrust section; and (b) a stepwise-rotating plate provided with a series of moulds which have an inlet alignable with said aperture and are removably connected to the relative plate to allow extraction of the moulded whole cheese.

17 Claims, 3 Drawing Figures

MOULDING MACHINE FOR THE PRODUCTION OF CACIOCAVALLO AND SIMILAR CHEESES

BACKGROUND OF THE INVENTION

This invention relates to a moulding machine for the production of caciocavallo and similar cheeses.

In spite of the fact that process mechanization has reached very advanced stages, certain operations in the dairy products sector are still carried out manually by highly qualified craftsmen. This is so in the production of provola, caciocavallo, scamorza and similar plastic curd cheeses. These products, of approximately spherical or pear shape, with or without the typical head, require operators able to model the cheese fibres until the required product shape is obtained. This operation requires immersing the hands in the plasticising water, the temperature of which is approximately 50°-60° C., ie relatively high. The operation is very costly because it requires expert operators, and also because the uncomfortable operating conditions strongly limit operator productivity.

SUMMARY OF THE INVENTION

The object of the present invention is to provide a moulding machine which obviates the need for specialized personnel and considerably increases hourly production.

This and further objects which will be more apparent from the detailed description given hereinafter are attained according to the invention by a moulding machine characterized essentially by comprising a thrust section for the plastic curd, and an actual moulding section fed by the thrust section and comprising: (a) a fixed plate provided with an aperture for receiving the plastic curd supplied by the thrust section; and (b) a stepwise-rotating plate provided with a series of moulds which have an inlet alignable with said aperture and can be removed from the relative plate to allow extraction of the moulded whole cheese.

BRIEF DESCRIPTION OF THE DRAWING

The invention will be more apparent from the detailed description given hereinafter by way of example with reference to the accompanying drawing, in which.

DESCRIPTION OF THE PREFERRED EMBODIMENTS

Figure 1:
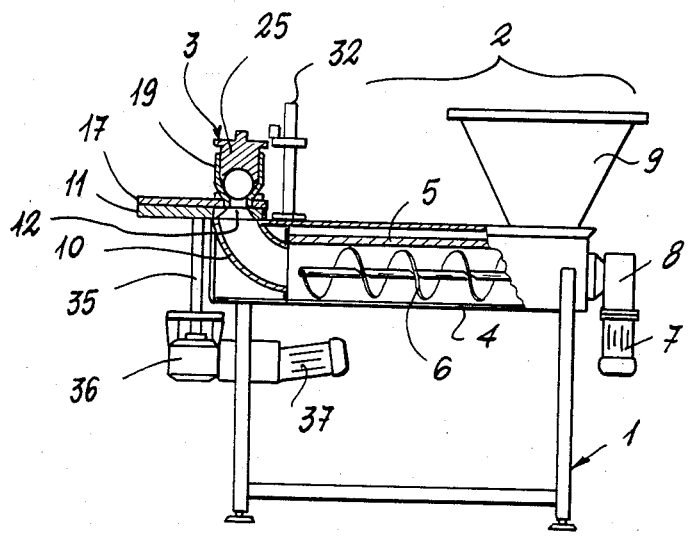
FIG. 1 is a diagrammatic view partly in side elevation and partly in longitudinal section, showing the moulding machine of the invention with some parts removed for representational simplicity.

In the figures, the reference numeral 1 indicates the moulding machine support frame, constructed of metal section bars welded together and supporting both the thrust section 2 and the actual moulding section 3.

In this example, the thrust section comprises a horizontal sheet-metal trough 4, possibly strengthened by section bars and at least partly closed by a removable cover 5. In the trough are disposed two counter-rotating screws of horizontal axis indicated by 6 and driven by a single electric motor 7 by way of an adjustable-speed reduction gear 8. The two screws can be connected together by gearing keyed on to their shafts so that the motion transmitted to one of them by the reduction gear then passes to the other. Instead of two screws, one or more than two can be provided. The screws and the geared motor unit can be supported by the trough, for example by one of its end walls.

In proximity to one of the ends of the trough, namely the loading end, there is provided a hopper 9 into which the plastic curd to be moulded is loaded.

The moulding section 3 comprises an upwardly tapering conduit 10 of upwardly curved axis which is connected lowerly to that section of the machine in which the screws 6 operate and which is defined by the trough 4 and cover 5. The moulding section 3 also comprises a fixed plate 11 rigid with the structure 1 and provided with an aperture 12, in which there is fixed a disc 13 possessing a frusto-conical compressing bore 14. The aperture 12 and bore 14 are aligned with the outlet of the conduit 10, and in its larger section the bore 14 has a diameter substantially equal to the outlet diameter of said conduit. The stationary plate 11 is fixed in such a manner as to form a seal along the contour of the outlet of the conduit 10.

A disc 16 of anti-friction material, for example teflon (tetrafluoroethylene), is rigid with the stationary plate 11 and is provided with a bore 13A aligned with a frusto-conical bore 14. On the disc of anti-friction material 16 there rests a stepwise-rotating plate 17 provided, in this example, with three equidistant bores 18, in each of which there is disposed the lower narrow end of a socket 19 provided with a flange 20 by which it rests on the stepwise-rotating plate 17. Around each bore 18 there is disposed at least one instant-locking device constituted by a cam 21 supported rotatably by the rotating plate 17 and manually controlled by a lever or arm 22 rigid with said cam. This cam cooperates with the flange 20 in order to retain the socket 19 in-situ. On rotating the cam 21, this latter disengages from the flange 20, making it possible to manually remove the socket 19 from the rotating plate 17.

Lowerly, at 23, the socket 19 is of substantially hemispherical shape. This hemisphere is followed by a cylindrical zone 24. In the socket there is slidably mounted a piston 25, which is upperly flanged at 26 and is lowerly provided with a hemispherical cavity 27 substantially corresponding to the cavity 23 of the socket 19. At its upper end, the piston 25 comprises a head 28. The rod 29 of a limit switch 30, the function of which will be explained hereinafter, is disposed in the trajectory of the piston and thus of the head. The switch 30 is supported by a bracket 31 which is adjustable in height along an upright 32 supported by the machine frame. On said upright there is supported in an analogous manner a second switch 33 controlled by projections 34 provided on the periphery of the rotating plate 17, their number being equal to the number of sockets 19. The function of said switch 33 will also be explained hereinafter.

The stepwise-rotating plate 17 is rigid with a drive shaft 35 controlled by an adjustable reduction gear 36 associated with an electric motor 37. The reduction gear and motor are supported in any known manner by the machine frame 1.

The operation is as follows:

The hot plastic curd is loaded into the hopper 9. The screws 6 urge the plastic curd along the conduit 10. The plastic curd enters the socket 19 and progressively occupies the space between the surface 27 of the piston 25 and the surface 23 of the socket 19. When this space has been filled, the extra paste entering the socket 19 causes the piston 25 to rise. At a certain point, the head 28 of this latter causes the switch 30 to operate and drive the electric motor 37 so as to rotate the plate 17. After a rotation of 120° (because the sockets 19 are three in number in this example), one of the projections 34 operates the switch 33, which stops the electric motor 37 and thus the plate 17. An empty socket (with its relative piston) has become located in a position corresponding with the feed conduit 10, and can be filled.

Figure 2:
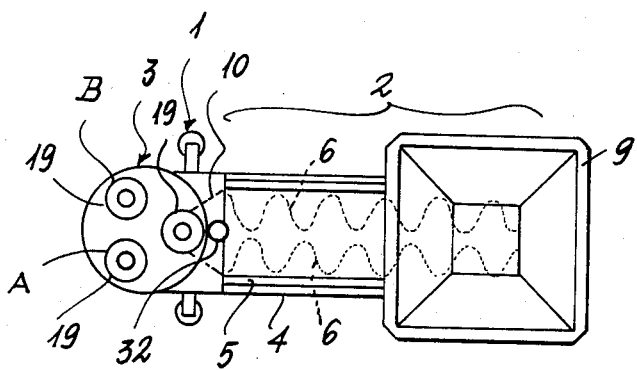
FIG. 2 is a diagrammatic plan view of the moulding machine with some parts removed.
Figure 3:
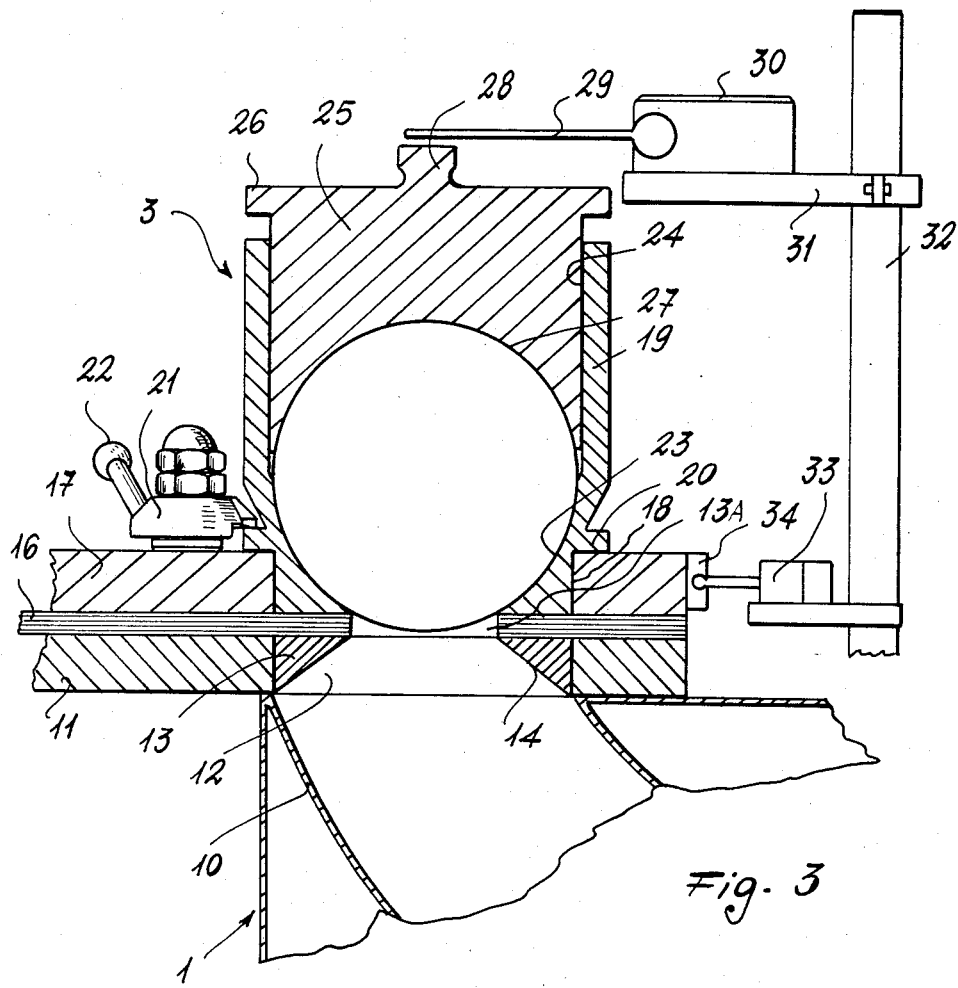
FIG. 3 is a vertical section through a detail of the moulding section of the machine of the invention, to an enlarged scale.

The previously filled socket has in the meantime reached a dwell position indicated by A in FIG. 2.

The described stages are then repeated, with the result that the filled socket reaches the discharge position indicated by B in FIG. 2. In this position, the socket 19 containing both the piston 25 and the moulded whole cheese is removed by the operator who for this purpose firstly rotates the cams 21 to disengage them from the flange 20 and then removes the socket 19 from the plate 17. The operator withdraws the piston 25 from the socket 19 and removes the moulded whole cheese, after which he remounts and locks the empty socket (with its relative piston) on the rotating plate 17. The next rotation of 120° moves the empty socket into the feed station.

In the case of caciocavallo, which notably comprises a head, the operator himself shapes the head on the bottom of the product, as the most difficult operation (obtaining a spheroidal shape) has already been carried out by the machine. In the case of caciocavallo, the paste fibres all pass through the cutting cross-section of the moulded whole cheese. It is therefore possible to hang the cheese by its head, without fear that the weight of the whole cheese will cause the neck to break.

Products of different weight can be formed with the same socket, by changing the position of the limit switch 30.

The piston 25 does not constitute an essential element of the invention, in that it can be dispensed with if a shape particularly close to spherical is not required. In this case, the filling of the socket can be controlled by a timer or visually by the operator. The timer or operator will then advance the plate 17 when the required time or degree of filling has been reached.

What is claimed is:

1. A moulding machine for the production of caciocavallo, provola, scamorza and similar plastic curd cheeses, comprising a thrust section for the plastic curd, and an actual moulding section fed by the thrust section and comprising:
   (a) a fixed plate provided with apertures for receiving the plastic curd supplied by the thrust section; and
   (b) a stepwise-rotating plate provided with a series of moulds which have an inlet alignable with said aperture and are removably connected to the rotating plate in order to allow extraction of the moulded whole cheese,
   each said mould having an internal cavity of cross-sectional area in a plane transverse to the direction of plastic curd flow at all times greater than cross-sectional area of said aperture.

2. A moulding machine for the production of caciocavallo, provola, scamorza and similar plastic curd cheeses, comprising a thrust section for the plastic curd, and an actual moulding section fed by the thrust section and comprising:
   (a) a fixed plate provided with apertures for receiving the plastic curd supplied by the thrust section; and
   (b) a stepwise-rotating plate provided with a series of moulds which have an inlet alignable with said aperture and are removably connected to the rotating plate in order to allow extraction of the moulded whole cheese,
   wherein each mould is in the form of a socket housed by way of its base in an aperture of the rotating plate and removably retained therein by instant-release means.

3. A machine as claimed in claim 2, wherein in the socket there is disposed a mobile piston which together with said socket defines the moulding chamber for the cheese.

4. A machine as claimed in claim 2, wherein the instant-release means comprise a cam cooperating with projecting parts of the socket.

5. A machine as claimed in claim 1, wherein adjustably positionable means for causing the rotating plate to undergo movement after the required filling of the mould, are provided in a trajectory of the piston.

6. A machine as claimed in claim 1, wherein means are provided for causing the stoppage of the rotating plate in the required positions.

7. A machine as claimed in claim 1, wherein the thrust section comprises at least one screw.

8. The machine of claim 2, wherein said instant-release means are manually operable.

9. The machine of claim 1, wherein said mould cavity is substantially hemispherical in shape adjacent said aperture.

10. The machine of claim 9, wherein said mould cavity is substantially cylindrical in shape away from said aperture.

11. The machine of claim 3, wherein said moulding chamber is substantially hemispherical in shape.

12. The machine of claim 1, additionally comprising a disc affixed to said fixed plate and having a frustoconical bore tapering in the direction of said mould, said frustoconical bore defining said aperture.

13. The machine of claim 12, additionally comprising a second disc rigidly disposed on said fixed plate between the same and said mould and having a bore subtantially aligned with said frustoconical bore to further define said aperture.

14. The machine of claim 7, comprising two counter-rotating screws.

15. The machine of claim 3, additionally comprising means for causing the rotating plate to undergo movement after the required filling of the socket, said means comprising
   a limiter switch disposed in a trajectory of said piston, and
   motor means for rotating said rotating plate and adapted to be actuated by said limiter switch when the piston contacts the same.

16. The machine of claim 15, additionally comprising means for stopping rotation of the rotating plate, which comprise
   projections provided on a periphery of the rotating plate, the number of projections corresponding to the number of sockets, and
   a second switch situated along a path of rotation of the projections and adapted to stop said motor means when a projection contacts the same.

17. The machine of claim 1, comprising three moulds substantially equidistantly spaced from one another about said rotating plate.

* * * * *